(12) United States Patent
Robb et al.

(10) Patent No.: US 8,544,546 B2
(45) Date of Patent: Oct. 1, 2013

(54) DELIVERING WATER-SOLUBLE POLYSACCHARIDES FOR WELL TREATMENTS

(75) Inventors: Ian D. Robb, Lawton, OK (US); Jason E. Bryant, Duncan, OK (US)

(73) Assignee: Halliburton Energy Services, Inc., Houston, TX (US)

( * ) Notice: Subject to any disclaimer, the term of this patent is extended or adjusted under 35 U.S.C. 154(b) by 313 days.

(21) Appl. No.: 12/771,888

(22) Filed: Apr. 30, 2010

(65) Prior Publication Data

US 2011/0155376 A1 Jun. 30, 2011

Related U.S. Application Data

(60) Provisional application No. 61/290,400, filed on Dec. 28, 2009.

(51) Int. Cl.
*E21B 43/27* (2006.01)
*E21B 43/22* (2006.01)

(52) U.S. Cl.
USPC ........ 166/300; 166/279; 166/304; 166/305.1; 166/308.2; 166/312

(58) Field of Classification Search
USPC ..................... 166/279, 304, 305.1, 308.1, 312
See application file for complete search history.

(56) References Cited

U.S. PATENT DOCUMENTS

| | | | |
|---|---|---|---|
| 3,881,552 A * | 5/1975 | Hessert | 166/294 |
| 4,330,414 A | 5/1982 | Hoover | |
| 4,392,964 A | 7/1983 | House | |
| 4,427,556 A * | 1/1984 | House et al. | 507/110 |
| 4,439,333 A | 3/1984 | House | |
| 4,462,917 A * | 7/1984 | Conway | 507/209 |
| 4,686,051 A | 8/1987 | House | |
| 4,929,655 A | 5/1990 | Takeda et al. | |
| 5,006,590 A | 4/1991 | Takeda et al. | |
| 6,451,743 B1 | 9/2002 | Fox | |
| 6,844,296 B2 * | 1/2005 | Dawson et al. | 507/211 |
| 7,271,134 B2 * | 9/2007 | King et al. | 507/226 |
| 2007/0021577 A1 * | 1/2007 | Rodrigues et al. | 527/309 |
| 2007/0187102 A1 * | 8/2007 | Putzig | 166/300 |

FOREIGN PATENT DOCUMENTS

EP 0016640 A1 10/1980

OTHER PUBLICATIONS

International Search Report for PCT/GB2010/002340 of Mar. 17, 2011.

* cited by examiner

*Primary Examiner* — Zakiya W Bates
*Assistant Examiner* — Silvana Runyan
(74) *Attorney, Agent, or Firm* — Robert A. Kent; Booth Albanesi Schroeder LLC

(57) ABSTRACT

A method including the steps of: (a) providing a dispersion comprising: a water-soluble polysaccharide and a carrier fluid, wherein the carrier fluid comprises: (i) glycerol, and (ii) a mono-hydroxylic alcohol having 1-3 carbons, wherein the mono-hydroxylic alcohol is present in at least 0.1% by weight of the glycerol, wherein the polysaccharide is insoluble in the carrier fluid; (b) mixing the dispersion with at least water to form an aqueous well treatment fluid, wherein the polysaccharide is soluble in the aqueous phase of the aqueous wellbore treatment fluid; and (c) introducing the aqueous treatment fluid into a subterranean formation.

20 Claims, 3 Drawing Sheets

DELIVERING WATER-SOLUBLE POLYSACCHARIDES FOR WELL TREATMENTS

CROSS-REFERENCE TO RELATED APPLICATIONS

This application claims priority from U.S. Provisional Patent Application No. 61/290,400 entitled "Delivering Water-Soluble Polysaccharides for Well Treatments" filed on Dec. 28, 2009, which is hereby incorporated by reference in its entirety.

TECHNICAL FIELD

The present invention relates to well treatment methods, and more particularly, to delivery of water-soluble polysaccharides for use in forming an aqueous well treatment fluid and associated well treatment methods.

BACKGROUND OF THE INVENTION

Oil and gas hydrocarbons are naturally occurring in some subterranean formations. A subterranean formation containing oil or gas is sometimes referred to as a reservoir. A reservoir may be located under land or off shore. Oil and gas reservoirs are typically located in the range of a few hundred feet (shallow reservoirs) to a few tens of thousands of feet (ultra-deep reservoirs). In order to produce oil or gas, a well is drilled into a subterranean formation.

In order to produce oil or gas, a well is drilled into a subterranean formation, which may be a reservoir or adjacent to a reservoir. As used herein, a "well" includes at least one wellbore drilled into a subterranean formation, which may be a reservoir or adjacent to a reservoir. A wellbore can have vertical and horizontal portions, and it can be straight, curved, or branched. As used herein, a "well" also includes the near-wellbore region. As used herein, "into a well" means and includes into any portion of the well, including into the wellbore or into the near-wellbore region via the wellbore.

Various types of treatments are commonly performed on a well or subterranean formation. For example, stimulation is a type of treatment performed on a well or subterranean formation to restore or enhance the productivity of oil and gas from the well or subterranean formation. Stimulation treatments fall into two main groups; hydraulic fracturing and matrix treatments. Fracturing treatments are performed above the fracture pressure of the subterranean formation to create or extend a highly-permeable flow path between the formation and the wellbore. Other types of treatments include, for example, controlling excessive water production.

A treatment typically involves introducing a treatment fluid into a well. As used herein, a "treatment fluid" is a fluid used to resolve a specific condition of a wellbore or subterranean formation. As used herein, a "treatment fluid" also means the specific composition of a fluid at the time the fluid is being introduced into a wellbore. A treatment fluid is typically adapted to be used to achieve a specific purpose, such as stimulation, isolation, or control of reservoir gas or water. The word "treatment" in the term "treatment fluid" does not necessarily imply any particular action by the fluid.

As used herein, a fluid can be homogeneous or heterogeneous. A homogeneous fluid consists of a single phase (e.g. a brine or a solution of dissolved chemicals.) An example of a heterogeneous fluid is a dispersion. A dispersion is system in which one phase is dispersed in another phase. An example of a dispersion is a suspension of insoluble particles in a liquid phase. Another example of a dispersion is an emulsion. Further, a treatment fluid can include a gas for foaming the fluid. As used herein, an "aqueous" fluid is a fluid that is either a homogeneous solution comprising water or a heterogeneous fluid wherein the external phase comprises water.

"Hydraulic fracturing," sometimes simply referred to as "fracturing," is a common stimulation treatment. A treatment fluid adapted for this purpose is sometimes referred to as a "fracturing fluid." The fracturing fluid is pumped at a sufficiently high flow rate and pressure into the wellbore and into the subterranean formation to create or enhance a fracture in the subterranean formation. Creating a fracture means making a new fracture in the formation. Enhancing a fracture means enlarging a pre-existing fracture in the formation.

A newly-created or extended fracture will tend to close together after the pumping of the fracturing fluid is stopped. To prevent the fracture from closing, a material must be placed in the fracture to keep the fracture propped open. A material used for this purpose is referred to as a "proppant."

The proppant is in the form of a solid particulate, which can be suspended in the fracturing fluid, carried downhole, and deposited in the fracture as a "proppant pack." The proppant pack props the fracture in an open condition while allowing fluid flow through the permeability of the pack. A particulate for use as a proppant is selected based on the characteristics of size range, crush strength, and insolubility.

The proppant pack in the fracture provides a higher-permeability flow path for the oil or gas to reach the wellbore compared to the permeability of the surrounding subterranean formation. This flow path increases oil and gas production from the subterranean formation.

The concentration of proppant in the treatment fluid is preferably in the range of from about 0.03 kilograms to about 3 kilograms of proppant per liter of liquid phase (0.25 lb/gal-25 lb/gal).

The proppant typically has a much different density than water. For example, water has a specific gravity of 1.0 and sand has a specific gravity of about 2.7. A different-density proppant contained in water will tend to separate from the water very rapidly. Increasing the viscosity of the water using a viscosity-increasing agent can help prevent the proppant from quickly separating out of the fluid. A viscosity-increasing agent is sometimes known in the art as a "thickener" or a "suspending agent."

For reference, the viscosity of water is about 1 cP. As used herein, a fluid is considered to be pumpable if it has a viscosity of less than 5,000 cP.

Because of the high volume of fracturing fluid typically used in a fracturing operation, it is desirable to efficiently increase the viscosity of fracturing fluids to the desired viscosity using as little viscosity-increasing agent as possible. Being able to use only a small concentration of the viscosity-increasing agent requires a lesser amount of the viscosity-increasing agent in order to achieve the desired fluid viscosity in a large volume of fracturing fluid. Efficient and inexpensive viscosity-increasing agents include water-soluble polymers. Typical water-soluble polymers used in well treatments are water-soluble polysaccharides. The most common water-soluble polysaccharide employed in well treatments is guar and its derivatives.

The viscosity of a fluid at a given concentration of viscosity-increasing agent can be greatly increased by cross-linking the viscosity-increasing agent. A cross-linking agent, sometimes referred to as a crosslinker, can be used for this purpose. One example of a cross-linking agent is the borate ion. Gel formation is based on a number of factors including the particular polymer and concentration thereof, the particular cross-linker and concentration thereof, the degree of crosslinking, temperature, and a variety of other factors known to those of ordinary skill in the art. A "base gel" is a fluid that includes a viscosity-increasing agent, such as guar, but that excludes cross-linking agents. Typically, a base gel is a fluid that is mixed with another fluid containing a crosslinker, wherein the mixed fluid is adapted to form a gel at a desired time in a well treatment.

Optionally, one or more other additives can be included to form a treatment fluid. For example, treatment fluids used in the invention also commonly include a "breaker." A breaker is a chemical used for the purpose of "breaking" the polymeric viscosifying agent, thus diminishing the viscosity of a fluid so that the fluid can be recovered more easily from the formation. Breakers reduce the molecular weight of the viscosity-increasing agent (which may be cross-linked) by the action of an acid, an oxidizer, an enzyme, or a combination of these. The acids, oxidizers, or enzymes can be in the form of delayed-release or encapsulated breakers.

In the case of a cross-linked viscosity-increasing agent, one way to diminish the viscosity is by breaking the cross-links. For example, the borate cross-links in a borate-crosslinked gel can be broken by lowering the pH of the fluid. At a pH above 8, the borate ion exists and is available to cross-link and cause gelling. At a lower pH, the borate is tied up by hydrogen and is not available for cross-linking, thus, an increase in viscosity due to borate cross-linking is reversible.

There are other uses for a water-soluble polysaccharide in a well treatment fluid. For example, during the drilling, completion, and stimulation of subterranean a well, it is common to pump an aqueous treatment fluid through tubular goods (e.g., pipes, coiled tubing, etc.) and into a subterranean formation adjacent a wellbore. A considerable amount of energy may be lost due to friction of the aqueous treatment fluid in turbulent flow through the tubular goods of the wellbore. As a result of these energy losses, additional pumping horsepower may be necessary to achieve the desired well treatment. To reduce these energy losses, a water-soluble polysaccharide may be included in aqueous treatment fluids. The use of an appropriate water-soluble polysaccharide as a friction reducer in a treatment fluid is expected to reduce the energy losses due to friction.

For example, in a "high-rate water fracturing treatment," proppant suspension in the treatment fluid is largely achieved by the high rate of pumping and the high flow rate of the treatment fluid. To reduce energy losses due to friction, a water-soluble polysaccharide as a friction reducer may be included in the fracturing fluid. While a fluid used in high-rate water fracturing may contain a water-soluble polysaccharide as a friction-reducing polymer, the polysaccharide is usually included in the fracturing fluid in an amount that is sufficient to provide the desired friction reduction without forming a gel and usually without a crosslinker. As a result, the fracturing fluids used in these high-rate water fracturing operations generally have a lower viscosity than conventional fracturing fluids.

Treatment fluids used in the invention can further contain other additives that are known to be commonly used in oil field applications by those skilled in the art. These include, but are not necessarily limited to inorganic water-soluble salts, breaker aids, surfactants, oxygen scavengers, alcohols, scale inhibitors, corrosion inhibitors, fluid-loss additives, oxidizers, and bactericides.

In the context of such uses for a water-soluble polysaccharide in a well treatment fluid and an associate well treatment method, the water-soluble polysaccharide has conventionally been provided as oil-external dispersion. The fluid currently used as a carrier fluid is a hydrocarbon, for example, diesel or a more environmentally-benign solvent such as alpha-olefins or saturated paraffin. The purpose of these is to suspend the water-soluble polysaccharide, such as guar. Upon mixing the dispersion with at least water to form an aqueous treatment fluid, the dispersion should invert, thereby releasing the polysaccharide into the aqueous phase.

However, the delivery of water-soluble polysaccharides for use in well treatment fluids and methods has proved challenging from an environment standpoint. The hydrocarbon carrier fluid present in the oil-external dispersion may pose environmental problems with the subsequent disposal of the treatment fluid. Among other reasons, disposal of hydrocarbons (e.g., such as the carrier fluid in the oil-external dispersion) may have undesirable environmental characteristics or may be limited by strict environmental regulations in certain areas of the world. Furthermore, the hydrocarbon carrier fluid present in the oil-external dispersion may be perceived to contaminate water in the formation.

SUMMARY

According to the invention, a method is provided comprising the steps of: (a) providing a dispersion comprising: a water-soluble polysaccharide and a carrier fluid, wherein the carrier fluid comprises: (i) glycerol, and (ii) a mono-hydroxylic alcohol having 1-3 carbons, wherein the mono-hydroxylic alcohol is present in at least 0.1% by weight of the glycerol, wherein the polysaccharide is insoluble in the carrier fluid; (b) mixing the dispersion with at least water to form an aqueous well treatment fluid, wherein the polysaccharide is soluble in the aqueous phase of the aqueous wellbore treatment fluid; and (c) introducing the aqueous treatment fluid into a subterranean formation.

As used herein, the words "comprise," "have," "include," and all grammatical variations thereof are each intended to have an open, non-limiting meaning that does not exclude additional elements or steps.

The features and advantages of the present invention will be apparent to those skilled in the art. While numerous changes may be made by those skilled in the art, such changes are within the spirit of the invention.

BRIEF DESCRIPTION OF THE DRAWING

The accompanying drawing is incorporated into the specification to help illustrate examples according to the presently most-preferred embodiment of the invention. The drawing is not to be construed as limiting the invention.

DETAILED DESCRIPTION OF PREFERRED EMBODIMENTS

Figure 1:
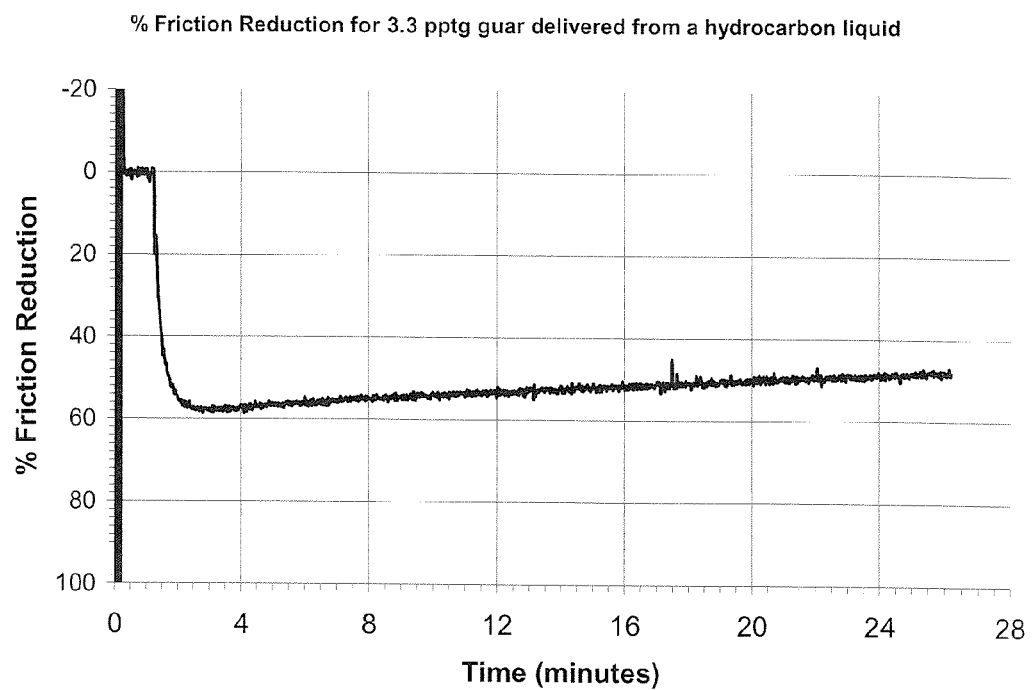
FIG. 1 is a graph showing friction reduction by guar delivered from a hydrocarbon liquid guar concentrate ("LGC"), specifically "LGC-35," which is a "WG-35" equivalent polymer (available from Halliburton, Houston, Tex.). The hydrocarbon liquid of the LGC is paraffinic. The graph is for a 3.3 pounds-per-thousand gallons guar delivered from an 80:20 mix of the LGC with Duncan tap water ("DTW") (tap water from Duncan, Okla.) at 28 gallons per minute.

A major component of a well treatment fluid for use in hydraulic fracturing is a high molecular mass water-soluble polysaccharide that has been conventionally delivered from a hydrocarbon liquid in which the polymer is insoluble. The carrier fluid can include other components, such as surfactants for good hydration, anti-scaling agents, breakers, and corrosion inhibitors. Guar and its derivatives are usually delivered from a hydrocarbon fluid and have previously produced quite good friction reduction, as shown in FIG. 1.

It has been discovered that glycerol (also known as glycerin) with an alcohol such as methanol or ethanol can act as an excellent fluid from which to deliver a water-soluble polysaccharide such as guar. Glycerol is a non-solvent for most water-soluble polysaccharides and is miscible with water. Glycerol is a rather viscous liquid and this can sometimes retard the rate of dissolution of the polymer into water. It has been discovered, however, that a mixture of glycerol with monohydroxylic solvents such as methanol or ethanol, which are less viscous, can enhance the rate of dissolution of these water-soluble polysaccharides compared to dissolution from pure glycerol. It is expected that some other water-soluble polysaccharides such as guar derivatives and cellulose derivatives can also be delivered from a glycerol-alcohol mixture.

The purpose of this invention is to produce a carrier fluid for the delivery of a water-soluble polysaccharide. The carrier fluid can be employed in well treatment methods. The advantages of this carrier fluid include: (a) it is more environmentally acceptable than any hydrocarbon based fluid and (b) it is available at low cost for the raw materials.

According to the invention, a method is provided comprising the steps of: (a) providing a dispersion comprising: a water-soluble polysaccharide and a carrier fluid, wherein the carrier fluid comprises: (i) glycerol, and (ii) a mono-hydroxylic alcohol having 1-3 carbons, wherein the mono-hydroxylic alcohol is present in at least 0.1% by weight of the glycerol, wherein the polysaccharide is insoluble in the carrier fluid; (b) mixing the dispersion with at least water to form an aqueous well treatment fluid, wherein the polysaccharide is soluble in the aqueous phase of the aqueous wellbore treatment fluid; and (c) introducing the aqueous treatment fluid into a subterranean formation.

As used herein, soluble means that a chemical compound or substance is at least 2% by weight soluble in another fluid at 77° F. and a pressure of one atmosphere. In the case of water soluble, the water is deionized water.

Preferably, the polysaccharide is insoluble in pure glycerol.

Preferably, the polysaccharide is selected from the group consisting of guar, a guar derivative, a cellulose derivative, and any combination thereof. As used herein, "derivative" means a compound or substance formed by a chemical process from a parent compound or substance, wherein the chemical skeleton of the parent exists in the derivative. The chemical process preferably includes at most a few chemical steps, and more preferably only one or two chemical steps. An example of a chemical step is a substitution reaction. A substitution on a polymeric material may be partial or complete.

The guar derivative can be selected from the group consisting of a carboxyalkyl derivative of guar, a hydroxyalkyl derivative of guar, and any combination thereof. Preferably, the guar derivative is selected from the group consisting of carboxymethylguar, carboxymethylhydroxyethylguar, hydroxyethylguar, carboxymethylhydroxypropylguar, ethyl carboxymethyl guar, and hydroxypropylmethylguar.

The cellulose derivative can be selected from the group consisting of a carboxyalkyl derivative of cellulose, a hydroxyalkyl derivative of cellulose, and any combination thereof. Preferably, the cellulose derivative is selected from the group consisting of carboxymethylcellulose, carboxymethylhydroxyethylcellulose, hydroxyethylcellulose, methylcellulose, ethylcellulose, ethylcarboxymethylcellulose, and hydroxypropylmethylcellulose.

Preferably, the glycerol is present in at least 70% by weight of the carrier fluid. According to a particular advantage of the present invention, at least a portion of the glycerol in the carrier fluid can be obtained as a by-product of bio-diesel production. Most preferably, the carrier fluid is substantially free of refined glycerol. According to another preferred embodiment, at least a portion of the glycerol in the carrier fluid is obtained as a by-product of bio-diesel production and at least a portion of the alcohol is obtained as a by-product of bio-diesel production. According to a presently most preferred embodiment of the invention, the alcohol is methanol.

Biodiesel production worldwide has been on an exponential growth curve over the past several years. Biodiesel processing involves the production of alkyl esters of long chain fatty acids by reacting the source acid with a low molecular weight alcohol, such as methanol or ethanol. For example, a process for manufacturing fatty acid alkyl esters involves the transesterification of triglycerides using methanol, in the presence of an alkali catalyst. In addition to the desired fatty acid alkyl esters, this process produces an effluent stream comprising glycerol (glycerol), excess alcohol, water, alkyl esters and a mixture of mono, di, and triglycerides resulting from the transesterification step. The effluent stream is separated into biodiesel and crude glycerol, also known as crude glycerin, which is typically from about 80 to about 90% by weight pure glycerol with water, excess alcohol, and residues from hydrolysis of vegetable oils. This crude glycerol currently has low value because of these impurities.

As used herein, "crude glycerol" means and refers to a by-product obtained from biodiesel production, wherein the byproduct is either "crude" in the sense that it is completely crude or only partially refined such that the byproduct comprises less than about 95% glycerol.

Preferably, the mono-hydroxylic alcohol is present in at least 10% by weight of the glycerol in the carrier fluid. It is believed that the alcohol helps to increase the rate of dissolution of the polysaccharide when the dispersion is mixed with water.

Preferably, the carrier fluid comprises less than 15% by weight water. It is believed that a higher concentration of water in the carrier fluid may hydrate the water-soluble polysaccharide to an extent that it may become tacky or sticky and interfere with the ready dispersion of the polysaccharide in the carrier fluid. It is further believed it can be advantageous to include an inorganic salt in any water of the carrier fluid in the case of a certain water-soluble polysaccharides that are less soluble in salt water, which would help reduce hydration of the polysaccharide in the carrier fluid.

Preferably, the carrier fluid is substantially free of petroleum distillates. It should be understood, of course, that petroleum distillates are produced from crude oil. These include, for example, diesel and mineral oil. An advantage of avoiding petroleum distillates is avoiding any aromatic compounds that they may contain, which are often considered to be environmental pollutants.

According to a preferred embodiment, the concentration of the polysaccharide in the carrier fluid is at least 20% by weight of the carrier fluid, and more preferably the concentration of the polysaccharide in the carrier fluid is at least 40% by weight of the carrier fluid.

The method can further include the step of transporting the dispersion from a remote location to a well site of a well penetrating the subterranean formation.

The step of mixing the dispersion with at least water can include dosing the water with the dispersion. This is a preferred manner of controlling the mixing proportions in the forming of a treatment fluid.

The step of mixing the dispersion with at least water preferably forms a treatment fluid having a concentration of the polysaccharide in the range of from about 0.02% to about 0.5% by weight of the aqueous treatment fluid.

In another embodiment, the aqueous treatment fluid can be for use in a conventional water fracturing treatment, wherein the water-soluble polysaccharide is cross-linked to substantially increase the viscosity of an aqueous treatment fluid. In such a case, the step of mixing the dispersion with at least water is adapted to form a treatment fluid having a concentration of the polysaccharide and a crosslinker such that the treatment fluid is capable of forming a cross linked gel.

The aqueous treatment fluid can be for use in a high-rate water fracturing treatment, wherein the water-soluble polysaccharide is for use as a friction reducer. In such a case, the step of mixing the dispersion with at least water is adapted to form a treatment fluid having a concentration of the polysaccharide that is sufficient to substantially reduce the friction. Preferably, the step of mixing is adapted to form a treatment fluid having a concentration of the polysaccharide that is insufficient to form a gel.

In certain well treatments, the step of mixing the dispersion with at least water is adapted to form a treatment fluid comprising a salt either as a weighting agent or arising from the use of aqueous fluids returned from earlier well treatments.

The step of mixing the dispersion with at least water can be further adapted to form a treatment fluid further comprising at least one additive selected from the group consisting of: a surfactant, an anti-scaling agent, a crosslinker, a corrosion inhibitor, and a breaker.

According to a preferred well treatment method according to the invention, the aqueous treatment fluid is introduced into the subterranean formation at or above a pressure sufficient to create at least one fracture in the formation.

This invention can take advantage of the currently cheap price of crude glycerol to deliver a fracturing agent and provide a system that would cause little harm to drinking water if the carrier fluid or a treatment fluid made with the carrier fluid came into contact with aquifers. If a surfactant would be helpful, "food-compatible" ones could be selected. The advantage of glycerol is that it contains no hydrocarbon solvents that are perceived as having harmful aromatic materials, even if these are below detectable limits.

To facilitate a better understanding of the present invention, the following examples of certain aspects of preferred embodiments are given. The following examples are not the only examples that could be given according to the present invention and are not intended to limit the scope of the invention.

Figure 2:
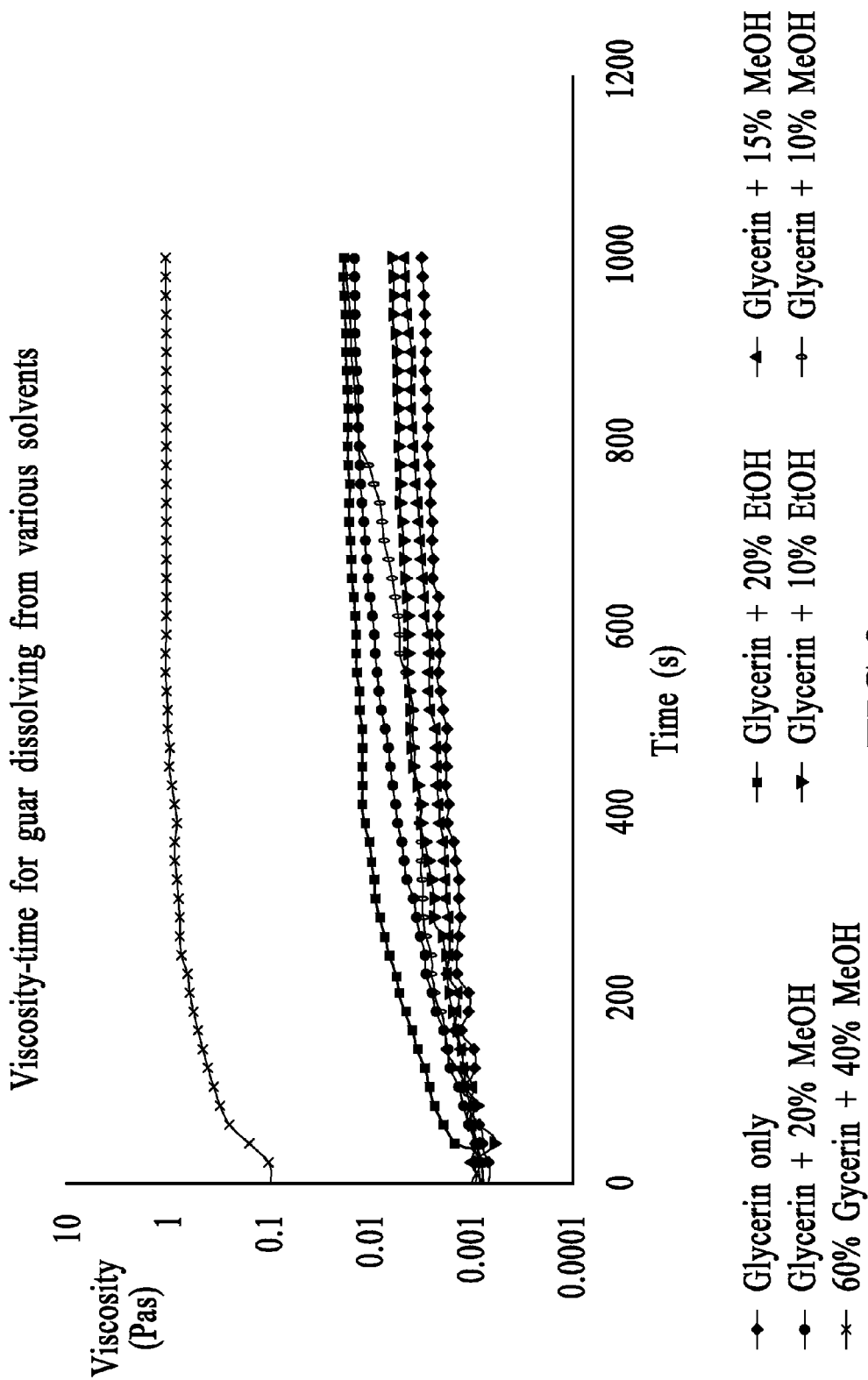
FIG. 2 is a graph showing viscosity (Pas) versus time for guar dissolving from various solvents, which can illustrate the use of the solvent as part of a carrier fluid for a water-soluble polysaccharide. The guar was delivered from 30% (w/v) guar in glycerin-alcohol mixtures. The dissolution of the guar into water was measured by placing 1 ml of the guar/glycerin/alcohol dispersion in the bottom of a Couette geometry cup of a Haake RheoStress 150 rheometer, followed by 4 ml of water. The Couette bob was then put in place and rotated at a speed to give a shear rate of 300 $s^{-1}$ and recording the viscosity. Faster dissolution of the guar into water was indicated by the faster generation of viscosity. More particularly, the solvents tested were: 100% glycerin, 90%-10% glycerin-methanol, 90%-10% glycerin-ethanol, 85%-15% glycerin-methanol, 80%-20% glycerin-methanol, 80%-20% glycerin-ethanol, and 60%-40% glycerin-methanol.

The rate of dissolution of guar from glycerin-alcohol mixtures is shown in FIG. 2. The guar was delivered from 30% (w/v) guar in glycerin-alcohol mixtures. The dissolution of the guar into water was measured by placing 1 ml of the guar/glycerin/alcohol dispersion in the bottom of a Couette geometry cup of a Haake RheoStress 150 rheometer, followed by 4 ml of water. The Couette bob was then put in place and rotated at a speed to give a constant shear rate of 300 $s^{-1}$ and recording the viscosity. Faster dissolution of the guar into water was indicated by the faster generation of viscosity. More particularly, the solvents tested were: 100% glycerin, 90%-10% glycerin-methanol, 90%-10% glycerin-ethanol, 85%-15% glycerin-methanol, 80%-20% glycerin-methanol, 80%-20% glycerin-ethanol, and 60%-40% glycerin-methanol. These results show that the addition of methanol or ethanol at as low concentrations as 10% in glycerol improves the rate of hydration as measured by the viscosity of the solution.

Figure 3:
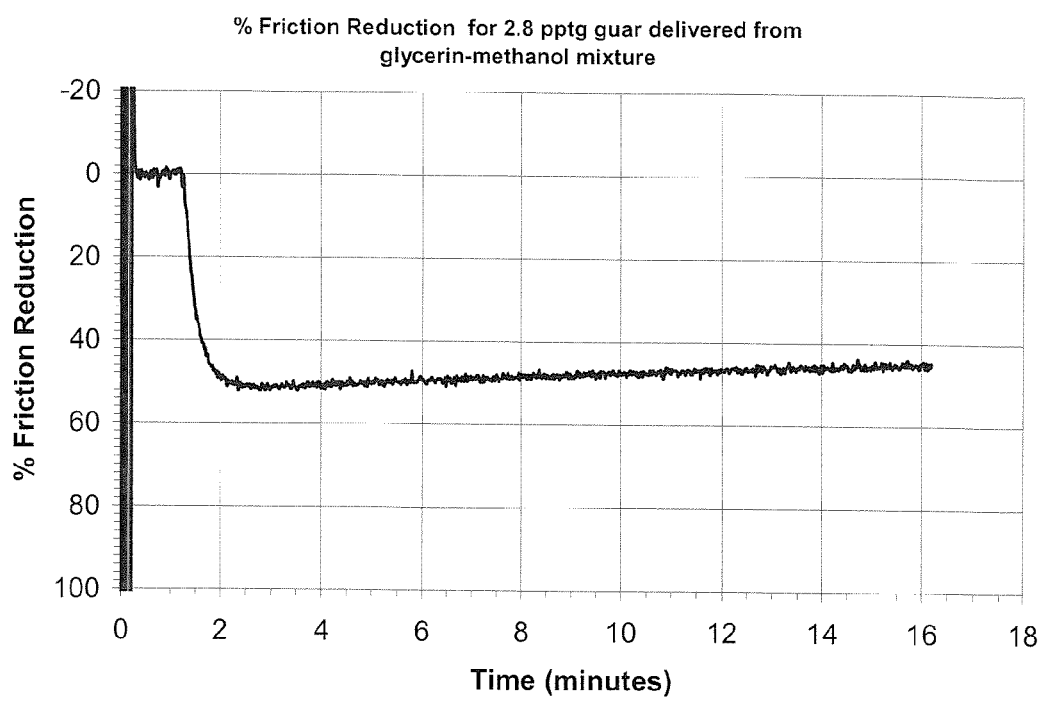
FIG. 3 is a graph showing friction reduction by guar delivered from a 70:30 mix of glycerin and methanol.

FIG. 3 is a graph showing friction reduction by guar delivered from a 70:30 mix of glycerin and methanol. This illustrates that guar and its derivatives can be delivered from a glycerol/mono-hydroxylic alcohol mixture and produce quite good friction reduction.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is, therefore, evident that the particular illustrative embodiments disclosed above may be altered or modified and all such variations are considered within the scope and spirit of the present invention. While compositions and methods are described in terms of "comprising," "containing," or "including" various components or steps, the compositions and methods also can "consist essentially of" or "consist of" the various components and steps. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a to b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an", as used in the claims, are defined herein to mean one or more than one of the element that it introduces. If there is any conflict in the usages of a word or term in this specification and one or more patent(s) or other documents that may be incorporated herein by reference, the definitions that are consistent with this specification should be adopted.

What is claimed is:

1. A method comprising:
(a) providing a dispersion comprising:
a water-soluble polysaccharide and
a carrier fluid, wherein the carrier fluid consists essentially of:
(i) glycerol, wherein the glycerol is present in at least 70% by weight of the carrier fluid, and (ii) a mono-hydroxylic alcohol selected from the group consisting of methanol, ethanol, and any combination thereof, wherein the mono-hydroxylic alcohol is present in at least 5% by weight of the glycerol, wherein the carrier fluid comprises less than 15% by weight water; and wherein the polysaccharide is insoluble in the carrier fluid;

(b) mixing the dispersion with at least water to form an aqueous well treatment fluid, wherein the polysaccharide is soluble in the aqueous phase of the aqueous well treatment fluid; and (c) introducing the aqueous treatment fluid into a subterranean formation.

2. The method according to claim 1, wherein the polysaccharide is insoluble in pure glycerol.

3. The method according to claim 1, wherein the polysaccharide is selected from the group consisting of guar, a guar derivative, a cellulose derivative, and any combination thereof.

4. The method according to claim 3, wherein the guar derivative is selected from the group consisting of a carboxyalkyl derivative of guar, a hydroxyalkyl derivative of guar, and any combination thereof.

5. The method according to claim 4, wherein the guar derivative is selected from the group consisting of carboxymethylguar, carboxymethylhydroxyethylguar, hydroxyethylguar, carboxymethylhydroxypropylguar, ethylcarboxymethylguar, and hydroxypropylmethylguar.

6. The method according to claim 3, wherein the cellulose derivative is selected from the group consisting of a carboxyalkyl derivative of cellulose, a hydroxyalkyl derivative of cellulose, and any combination thereof.

7. The method according to claim 6, wherein the cellulose derivative is selected from the group consisting of carboxymethylcellulose, carboxymethylhydroxyethylcellulose, hydroxyethylcellulose, methylhydroxypropylcellulose, methylcellulose, ethylcellulose, ethylcarboxymethylcellulose, and hydroxypropylmethylcellulose.

8. The method according to claim 1, wherein at least a portion of the glycerol in the carrier fluid is obtained as a by-product of bio-diesel production.

9. The method according to claim 1, wherein the alcohol is methanol.

10. The method according to claim 1, wherein the carrier fluid is free of petroleum distillates.

11. The method according to claim 1, wherein the concentration of the polysaccharide in the carrier fluid is at least 20% by weight of the carrier fluid.

12. The method according to claim 1, further comprising the step of transporting the dispersion from a remote location to a well site of a well penetrating the subterranean formation.

13. The method according to claim 1, wherein the step of mixing the dispersion with at least water comprises: dosing the water with the dispersion.

14. The method according to claim 1, wherein the step of mixing the dispersion with at least water forms a treatment fluid having a concentration of the polysaccharide in the range of from about 0.02% to about 0.5% by weight of the aqueous treatment fluid.

15. The method according to claim 1, wherein the step of mixing the dispersion with at least water forms a treatment fluid further comprising a crosslinker for the polysaccharide.

16. The method according to claim 15, wherein the step of mixing the dispersion with at least water forms a treatment fluid that is capable of forming a cross linked gel.

17. The method according to claim 1, wherein the step of mixing the dispersion with at least water forms a treatment fluid having a concentration of the polysaccharide that is insufficient to form a cross linked gel.

18. The method according to claim 1, wherein the step of mixing the dispersion with at least water forms a treatment fluid comprising a salt.

19. The method according to claim 1, wherein the step of mixing the dispersion with at least water forms a treatment fluid further comprising at least one additive selected from the group consisting of: a surfactant, an anti-scaling agent, a crosslinker, corrosion inhibitor, and a breaker.

20. The method according to claim 1, wherein the aqueous treatment fluid is introduced into the subterranean formation at or above a pressure sufficient to create at least one fracture in the formation.

* * * * *